United States Patent

[11] 3,565,330

[72] Inventor Allen Latham, Jr.
 Jamaica Plain, Mass.
[21] Appl. No. 744,196
[22] Filed July 11, 1968
[45] Patented Feb. 23, 1971
[73] Assignee Cryogenic Technology, Inc.
 Waltham, Mass.
 Continuation-in-part of application Ser. No. 611,073, Jan. 23, 1967, Patent No. 3,409,213

[54] ROTARY SEAL AND CENTRIFUGE INCORPORATING SAME
 5 Claims, 5 Drawing Figs.
[52] U.S. Cl. ........................................................ 233/21, 233/1, 277/88
[51] Int. Cl. ........................................................ B04b 7/00, B04b 11/00
[50] Field of Search ........................................... 233/21, 1; 277/88

[56] References Cited
UNITED STATES PATENTS
2,637,491  5/1953  Fitzsimmons ............... 233/21
3,409,213  11/1968  Latham, Jr. ................. 233/21

*Primary Examiner*—William I. Price
*Attorney*—Bessie A. Lepper

ABSTRACT: A rotary seal formed of a first rigid, low friction member which contacts a moving rigid member with minimal friction to make the dynamic seal, and a second elastomeric member which provides a resilient static seal and a spring action force between the surfaces of the dynamic seal. Means are provided to overcome any static friction or momentary aberrations encountered in startup. The seal is particularly suitable for centrifuges for continuous sterile operations such as in the treating of blood.

Allen Latham, Jr.
INVENTOR.

BY [signature]
Attorney

ROTARY SEAL AND CENTRIFUGE INCORPORATING SAME

This application is a continuation-in-part of my pending application Ser. No. 611,073 now U.S. Pat. No. 3,409,213.

In the process of storing or handling human blood it is necessary to carry out certain steps, among which is centrifuging. Apparatus have been developed to meet the particularly stringent demands which accompany the handling of blood to prevent it from suffering traumatic effects. Among such apparatus are the specially designed centrifuges described in my U.S. Pat. No. 3,145,713 and in U.S. Pat. No. 3,317,127. Although the rotary seal of this invention is particularly well adapted for use in the centrifuges described in the aforementioned patents, it has broad applications to pumps, centrifuges, and to stirring and mixing devices in general which are used in processing temperature sensitive materials.

In the centrifuge for sterile processing it is necessary to provide an effective seal between the rotating and stationary members of the apparatus. In centrifuges suitable for continuously handling blood or other fluids subject to contamination it is desirable that the centrifuge bowl and its associated parts perform the rotation while the conduits which make up the fluid inlet and outlet of the centrifuge remain stationary. This then requires an effective rotating seal in which frictional heating is so low and the dissipation of heat to heat sinks is so high that the blood, or other heat sensitive fluid, will not be exposed to any hot spots. Further, it requires a seal which does not produce any particulate contaminants which might be introduced into the blood or other liquid during its passage through the centrifuge. It is also desirable that such apparatus have seals which are simple to install and maintain in a clean, sterile condition. An additional requirement for the seal is that it achieves very high reliability in service. This in turn requires that the seal is capable of tolerating moderate misalignment and vibration between the rotating and nonrotating parts.

In my copending application Ser No. 611,073 I have disclosed a rotating seal which generally meets these requirements. However, in some apparatus difficulties have been encountered with static friction or other conditions contributing to unusually high torques experienced in startup. Such conditions may lead to slipping of one or both parts of the seal assembly and failure of the seal at startup to rotate with the rotating components of the centrifuge. In order to eliminate such startup difficulties and insure perfect sealing at all times, the apparatus of this invention is provided with means to lock the rotary seal to the centrifuge body in such a way that it rotates with the centrifuge body while at the same time being free to move axially and to experience some wobble.

It is therefore a primary object of this invention to provide an improved rotary seal particularly well suited for use in centrifuges, the seal being capable of continuous reliable operation. It is another object of this invention to provide a rotary seal of the character described which does not develop localized heating, which produces substantially no particulate contaminants and which is caused to rotate with the rotating components of the centrifuge to prevent any difficulties during startup. It is another object to provide a seal which will operate with complete reliability despite moderate misalignment and vibration of the rotating and nonrotating parts. Other objects of the invention will in part be obvious and in part be apparent hereinafter.

The invention accordingly comprises the features of construction, combination of elements, and arrangement of parts which will be exemplified in the constructions hereinafter set forth and the scope of the invention will be indicated in the claims.

A number of different types of rotary seals have been used in the prior art. These generally include one or more O-ring secondary seals in addition to a carbon ring and a metallic mating ring. In many cases they require as many as six different component parts and their rubbing surfaces, where the dynamic seal is effected, tend to overheat.

The rotary seal of this invention is formed of only two members. The upper member is an elastomeric member which forms, through an upper contoured section, a static seal with a rotating member of the centrifuge which has a complementary configuration. The lower member of the rotary seal may be a carbon or graphite member which is contoured to fit the upper member and which has means associated with it to insure the rotation of the seal with the rotating bowl, thus maintaining the seal assembly in its desired relationship even if it experiences static friction or momentary aberrations in startup. The lower seal member has a lower surface which forms a low friction dynamic seal with a stationary member of the centrifuge. The surface of the stationary member which contacts the lower member of the rotary seal may be hard-surfaced aluminum, for such a rubbing contact does not generate particulate contaminants. The aluminum, being a good heat conductor, rapidly dissipates and conducts away any localized heating generated by the dynamic seal. If the seal is to be reused, it is preferred that the two members are keyed to make it easy to snap them together and to separate them for sterilizing.

For a fuller understanding of the nature and objects of the invention, reference should be had to the following detailed description taken in connection with the accompanying drawings in which.

Figure 1:
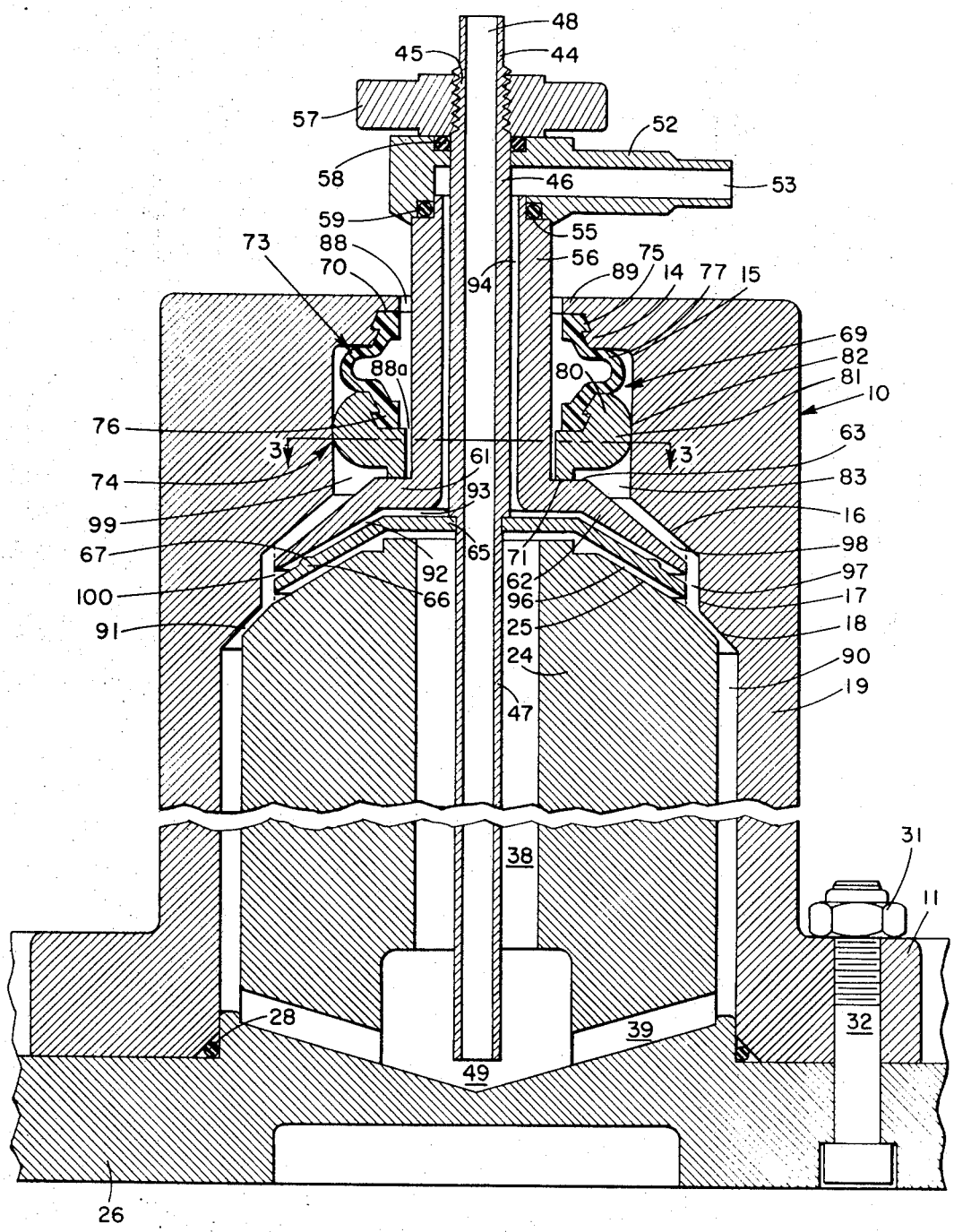
FIG. 1 is a cross section of a centrifuge incorporating one embodiment of the rotary seal of this invention.

The rotary sealing assembly of this invention is shown in detail in FIG. 1 as it may be installed in a centrifuge suitable for processing blood. References should also be had to various cross-sectional drawings where indicated. The main centrifuge body 10 terminates in its lower end in a flange 11. Internally it defines a cavity, and it can be considered to be formed of a number of different sectional configurations. Reading from top to bottom in FIG. 1 these are keyed section 14, a first small cylindrical section 15, an inclined section 16, a second cylindrical section 17, a second inclined section 18, and finally a main cylindrical section 19 which, as will become apparent later, contains the major portion of the centrifuge core. The core can be seen to be made up of a central cylindrical section 24, having a conical or inclined upper section 25 and a core flange 26. This flange is adapted for engagement with a driving chuck in the well-known manner of centrifuge design and construction. This is done by affixing the body and core through their respective flanges 11 and 26, sealed with an O-ring 28, by means of flange screws 32 and nuts 31 and using the larger flange to grip a chuck (not shown).

A core passage 38 runs axially through the center of the core 24 and plurality of inclined radial passages 39 are drilled from the outside of the lower end of the cylindrical section of the core into the core passage.

The seal assembly rotates with the bowl and core, while other components of the centrifuge remain stationary as will be now described. Feed tube 44 is meet by any suitable means not shown to the source of liquid to be centrifuged. In its upper section this has a threaded section 45 which then gives way to a thicker-walled section 46 and subsequently to a thinner-walled section 47 which is within core passage 38 and axially aligned therein. The feed tube thereby defines a fluid passage 48 which offers direct communication between the fluid source and the volume within the centrifuge defined at the mixing 49 of the axial core passage 38 and the inclined radial passages 39 of the core.

A header 52, having a supernatant outlet conduit 53 is slipped down over section 46 of the feeder tube to rest on a shoulder 55 of an effluent tube 56. This external assembly is held in place by means of a threaded knurled nut 57 and sealing is accomplished through the use of O-ring seals 58 and 59. The effluent tube 56 terminates at its lower end in a horizontal section 61 which, in turn, is integral with a frustoconical section 62. The horizontal section 61 provides a shoulder 63 for supporting the sealing assembly. Directly below the horizontal and inclined sections of the effluent tube is positioned a passage-defining member affixed to the enlarged section 46 of the feeder tube and consisting of a horizontal section 65 and an inclined section 66, the latter having a row of protuberances 67 which act as spacer means between the two passage-defining members. These may be ground on top so that they are on the same conical surface and at an angle corresponding to the conical angle of the contacting surface of section 62.

The rotary sealing assembly is generally indicated by the numeral 69 and it forms a fluid tight seal between the rotating centrifuge body 10 and the stationary members made up of the feed tube and the effluent tube. Since the rotary seal rotates with bowl 10 it must form a static seal at 70 and a dynamic seal at 71. It accomplishes this by forming a friction grip at its upper section with the centrifuge body and by making rubbing contact at the point of the dynamic seal 71. Locking means described below are provided to insure perfect sealing from startup.

Figure 2:
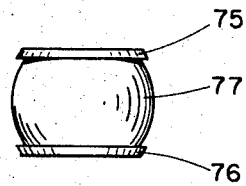
FIG. 2 is a side elevational view of the upper member of the rotary seal of FIG. 1 removed from the sealing assembly of the centrifuge.

The seal assembly is formed of an upper elastomeric member 73 and a lower rigid, low friction member 74. The upper elastomeric member 73 can be considered to have three sections: namely, an upper keyed section 75, a lower keyed section 76, and thin deformable central section section 77. The elastomeric member is molded in the configuration shown in FIG. 2. It is preferably molded of a material having an intermediate degree of hardness, e.g., from about 25 to 55 on the durometer scale. It will be seen that when this member is installed in the seal assembly (FIG. 1) the central deformable section is compressed; and in this compressed state the upper and lower keyed sections are forced against their corresponding contacting surfaces. If the elastomeric member is formed of an excessively hard material it will be difficult to mold and insert; while if it is too soft it will not hold its shape and be able to withstand the required seal bearing pressure. If the centrifuge or other device in which the seal is installed is used to process liquid which must be maintained free from contamination, then the elastomeric sealing member must be formed of a material which can tolerate autoclaving or similar sterilizing. It must also be of a material with which such liquids may come in contact without experiencing any reaction therewith. In the case of centrifuges for processing blood the silicone rubbers have been found to be particularly well suited.

Figure 3:
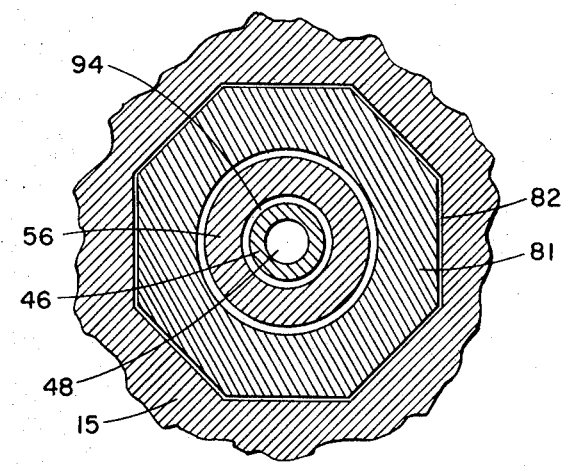
FIG. 3 is a cross section of the rotary seal taken along line 3—3 of FIG. 1 showing the use of multifaceted cylindrical segments as locking means.

The lower rigid, low friction seal member 74 has an upper keyed section 80 which is adapted to engage and snap into the lower keyed section 76 of elastomeric member 73. The central section 81 of the rigid, low friction seal member is locked to prevent any substantial rotation (and hence any substantial rotation of the rotary seal) relative to the centrifuge body 10, particularly during startup. In the embodiment of FIGS. 1 and 3, the locking means are provided by constructing the outer surface of the central section 81 with a multifaceted configuration. Thus, as shown in FIG. 3, there are 8 such facets 82 and the recess 83, defined within the first small cylindrical section 15 of the centrifuge body 10, is machined to conform to the outer configuration of the central section 81 of the rigid, low friction seal member. (See FIG. 3) This arrangement thereby insures rotation of the seal with the rotating components of the centrifuge. It is, of course, within the scope of this invention to use any suitable number of facets 82, eight being only illustrative. In the absence of the locking means between the assembly and the centrifuge body it is possible that static friction, momentary aberrations or other factors which contribute to an unusually high torque in starting, may cause the seal assembly to remain stationary at startup rather than to rotate with the centrifuge body. If the seal assembly remains static then friction is generated where its surfaces contact the surfaces of the centrifuge body. Since the centrifuge body is conveniently formed of a thermoplastic resin, the heat of such friction can soften the contacting surfaces and destroy the fit of the seal and even the centrifuge body itself.

Figure 4:
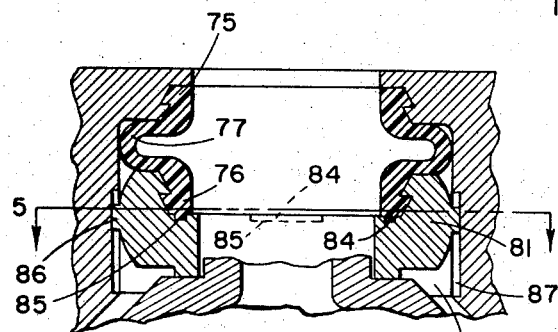
FIG. 4 is a longitudinal cross section of the rotary seal of this invention showing keys as the locking means.
Figure 5:
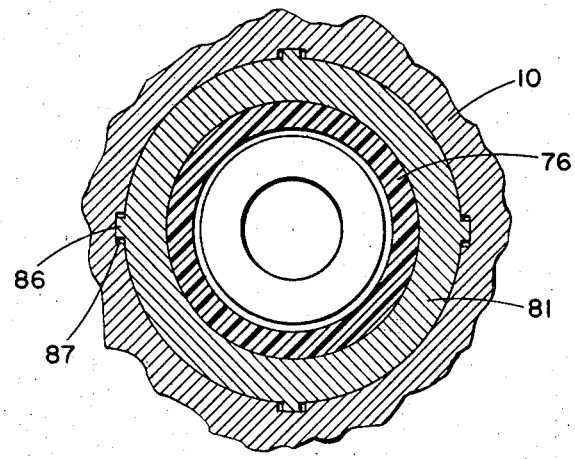
FIG. 5 is a cross section of the modification of FIG. 4 taken along line 5—5 of FIG. 4.

FIGS. 4 and 5 illustrate another embodiment of locking means to prevent relative rotation between the rotary seal and the centrifuge body and insure proper startup of the apparatus. In FIGS. 4 and 5 like reference numerals are used to identify like components in FIGS. 1, 2 and 3. In the embodiment of FIGS. 4 and 5 additional locking means are provided to insure the maintaining of the required static seal of the upper elastomeric seal member to the lower member. This is accomplished through the incorporation of several spaced tongues 84 in the bottom surface of the upper seal member and corresponding grooves 85 in the lower member. This type of locking is, of course, also applicable to the embodiment of FIGS. 1—3.

Locking of the rotary seal assembly to the rotating centrifuge body 10 is accomplished by keys 86 on the outer periphery of the central section 81 of the lower seal member and keyways 87 in the centrifuge body. Any suitable number of these keys/keyways may be used; and even a single key/keyway can prevent the unwanted relative rotation. The position of these keys and keyways may, of course, be reversed, the keys being in the wall of the recess 83 and the keyways in the surface of the central section of the lower seal member.

Returning now to FIG. 1, it will be seen that the bottom surface of the rigid lower seal member makes rubbing contact with shoulder 63. This rigid, low friction seal member is typically formed from carbon or graphite. However, it may also be formed of a molded polytetrofluoroethylene which is desirably loaded (at least on its surface) with a material such as graphite or other rigid, wear-resistant substance. The effluent tube 56 is preferably formed of aluminum and its shoulder 63 which makes rubbing contact with sealing member 74 is given a treatment to harden it. Typically this consists of forming a relatively thick oxide treatment coating on it to give it, in effect, a sapphire surface which is harder than the surface of sealing member 74. The rubbing contact surfaces should be accurately lapped. The rubbing resulting dynamic seal at 71 is one which is low in friction, very resistant to wear and does not generate any particulate contaminant matter. Heat generated at the dynamic seal is conducted by effluent tube 56 to tube-gripping means (not shown) for dissipation into the atmosphere.

The flexible nature of the upper seal member and general configuration of the lower seal member permit the sealing assembly to tolerate moderate misalignment and also prevent any possible damage which might be done to the member during its installation in the centrifuge. The rotary seal assembly is so designed as to be maintained in its proper position at all times while permitting gross clearances between the two members and the outside wall of the effluent tube 56. The clearance 88 between the upper member and tube 56 may be 1/16 inch or even more; while the clearance 88a between the lower member (which is less than clearance 88) may be up to about 1/16. Such relatively large clearances are possible because of the design and configuration of the seal assembly and because of the configuration of the housing around it, particularly to the lip 89 which prevents the upper part of the elastomeric member 73 from extruding upward and around the outer surface of the effluent tube 56. The gross clearances which are possible permit the apparatus to tolerate some misalignment of the rotating and nonrotating components without causing wear through bearing contact; and the protuberances 67 used as spacers between 62 and 66 prevent any distortion of the sealing assembly at the surface of the dynamic seal 71.

Modifications may be made in the configurations of two members making up the rotary seal. For example the barbs of the keyed sections may be eliminated and replaced with straight-lined sections in the elastomeric member and a corresponding section in the rigid, low friction member. This design is satisfactory for sealing members which are to be used only once and then thrown away. In such one-use seal assemblies the elastomeric and rigid low friction members may also be bonded along the lower contacting surfaces with a suitable adhesive such as a silicone-calking compound.

The flow of the fluid into the centrifuge and the discharge of the supernatent liquid from the centrifuge may best be explained by tracing the various passages through which the liquid travels downwardly through stationary passage 48 and onto rotating surface 49 from which it passes by centrifugal force through radial passages 39 into annular passage 90 which will be seen to be defined between the internal wall of the centrifuge body section 19 of the bowl and the external wall of the cylindrical core section 24. The primary centrifugal processing occurs in space 90. The supernatant liquid passes up through narrow passage 91, which is defined between the inclined sections of the body and core, through passage 97 and then into passage 92 which is defined by the passage-defining member 62 and 66. This, in turn, communicates with a horizontal passage 93 defined between sections 61 and 65 and finally enters the annular passage 94 which is defined between the enlarged section 46 of the feed tube and the effluent tube 56. This passage 94 leads directly into discharge conduit 53. Regions 38, 96 and 98 remain filled with air, or other gases, which was present in the bowl at the start of the operation. There is, thus, in effect, a cylindrical free surface 100 created along the vertical edges of passage-defining members 62 and 66. By preventing any blood from entering passages 96 and 98 it is possible to prevent physical damage to any of the red blood cells which otherwise might contact the surface 63.

An examination of FIG. 1 will show that the seal affords complete protection for the fluid being treated. There is no way in which contaminants, including bacteria, dust, etc., can enter the centrifuge through the rotary seal; and there is no way in which any of the liquid can be removed except through the fluid passage provided. There is therefore provided a completely isolated processing volume and a sterile regime.

A centrifuge, constructed as shown in FIG. 1 has been used to centrifuge components of human blood to concentrate platelets from platelet-rich plasma and wash the platelets to remove plasma. The rotary seal performed satisfactorily and the platelets thus prepared exhibited excellent morphological characteristics and other desirable attributes.

It is, of course, within the scope of this invention to use the rotary seal in a device wherein the seal, along that portion of the apparatus with which it makes a static seal, remains stationary while the remaining portion of device rotates. The seal may also, of course, be used in any equipment, other than centrifuges, where similar operational requirements exist.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

I claim:

1. A sealing assembly capable of effecting a fluid tight seal between two components, one of which is rotatable relative to the other, comprising in combination:
    a. an elastomeric ring member capable of forming a static seal with one of said components and having an upper section with a friction-generating outer surface and a pressure deformable central section;
    b. a rigid, low friction ring member capable of forming a dynamic seal having a lower surface adapted to make a low friction rubbing contact with a surface of the other of said components; and
    c. locking means associated with the outer surface of the central section of said rigid, low friction member and adapted to prevent relative rotation between said sealing assembly and the one of said components in which it is mounted.

2. A sealing assembly in accordance with claim 1 wherein said locking member comprises a multifaceted cylindrical configuration forming said outer surface of said central section.

3. A sealing assembly in accordance with claim 1 wherein said locking means comprise keys on said outer surface of said central section and corresponding keyways in the surface of said one of said components.

4. A centrifuge having a rotating assembly of components and a stationary assembly of components in axial alignment therewith, characterized in that it has incorporated therein a sealing assembly capable of effecting a fluid tight seal between said rotating assembly and said stationary assembly, said sealing assembly comprising in combination:
    a. an elastomeric ring member capable of forming a static seal with said rotating components and having upper and lower sections with friction-generating outer surfaces and a pressure deformable central section;
    b. a rigid, low friction ring member capable of forming a dynamic seal and having an upper section adapted to form a friction grip with said lower section of said elastomeric member and a lower surface adapted to make a low friction rubbing on contact with a surface of said stationary component; and
    c. locking means associated with the outer surface of the central section of said rigid, low friction member and adapted to prevent relative rotation between said sealing assembly and that assembly of components in which said sealing assembly is mounted.

5. A centrifuge adapted to process liquids which must be maintained free from contaminants and from localized heating and having a first and second assembly of components one of which is capable of rotating relative to the other comprising in combination:
    a. said first assembly of components comprising;
        1. feed tube means extending into said centrifuge and having attached to the wall thereof at a point intermediate between its two ends a horizontal ring which terminates in a first downwardly inclined skirt;
        2. effluent tube means surrounding said feed tube means above said horizontal ring and defining therewith an annular channel adapted to provide supernatant liquid withdrawal means, said effluent tube means terminating at its lower end in a horizontally disposed shoulder member having a second downwardly inclined skirt, said shoulder member providing a dynamic sealing surface; said horizontal ring and first downwardly inclined skirt of said feed tube means being positioned below said collar member and said second downwardly inclined skirt of said effluent tube means and arranged in spaced relationship therewith to define a fluid passage communicating between the centrifuge and said annular channel;
    b. said second assembly of components comprising:
        1. a centrifuge core having a centrally positioned passage into which said feed tube extends;
        2. a centrifuge housing surrounding said centrifuge core and defining around at least a portion of said effluent tube means a recess adapted to hold a rotary seal assembly; and
    c. a rotary seal assembly disposed around said effluent tube means and defining a spacing therewith, said seal assembly comprising:
        1. an elastomer ring member capable of forming a static seal with a portion of the surface of said recess of said centrifuge housing said elastomeric ring member having upper and lower sections with friction-generating outer surfaces and a pressure deformable central section;
        2. a rigid, low friction ring member capable of forming a dynamic seal and having an upper section adapted to form a friction grip with said lower section of said elastomeric member and a lower surface adapted to make a low friction rubbing contact with said dynamic sealing surface of said shoulder of said effluent tube means; and 3. locking means adapted to prevent relative rotation of said rotary seal assembly and said centrifuge housing.